United States Patent [19]

Barbieri

[11] Patent Number: 5,167,250

[45] Date of Patent: Dec. 1, 1992

[54] PRESSURE GAUGE FOR PUMPS, PARTICULARLY HAND PUMPS FOR BICYCLES, MOTORCYCLES OR THE LIKE

[76] Inventor: Adriano Barbieri, Via Della Grazia, 11-40131 Bologna, Italy

[21] Appl. No.: 826,495

[22] Filed: Jan. 27, 1992

[30] Foreign Application Priority Data

Feb. 4, 1991 [IT] Italy ............... B091A-000032

[51] Int. Cl.$^5$ .................. F16K 37/00; F04B 21/00
[52] U.S. Cl. ........................ 137/227; 417/63; 73/146.3
[58] Field of Search ........... 137/227, 557; 417/63, 417/374; 73/146.2, 146.3

[56] References Cited

U.S. PATENT DOCUMENTS

| | | | |
|---|---|---|---|
| 1,283,305 | 10/1918 | Rhonemus | 137/227 |
| 1,310,876 | 7/1919 | Savage et al. | 417/63 |
| 1,400,848 | 12/1921 | Anderson | 137/227 X |
| 1,425,614 | 8/1922 | Stickel | 417/63 X |
| 1,688,681 | 5/1928 | Kirlin | 137/227 |
| 1,750,214 | 3/1930 | Davis | 137/227 X |
| 2,168,145 | 8/1939 | Willis | 73/146.3 |
| 3,907,461 | 9/1975 | Bouder | 137/227 X |
| 4,120,614 | 10/1978 | Bouder | 137/227 X |
| 4,583,917 | 4/1986 | Shah | 417/374 X |

FOREIGN PATENT DOCUMENTS 33092 6/1928 France ................ 137/227

Primary Examiner—John Rivell
Attorney, Agent, or Firm—Guido Modiano; Albert Josif

[57] ABSTRACT

Pressure gauge for pumps, particularly hand pumps for bicycles, motorcycles or the like, including a cylinder sealingly connected between the outlet of the pump and the coupling for the valve of the tire; a piston is mounted inside the cylinder so that it can move in contrast with an elastic lamina and is connected to a rack which meshes with a rotatable sprocket with which a radial protrusion, provided with a pointer for indicating the pressure on a granduated scale, is rigidly associated.

1 Claim, 2 Drawing Sheets

PRESSURE GAUGE FOR PUMPS, PARTICULARLY HAND PUMPS FOR BICYCLES, MOTORCYCLES OR THE LIKE

BACKGROUND OF THE INVENTION

The present invention relates to a pressure gauge for pumps, particularly hand pumps for bicycles, motorcycles or the like.

Hand pumps for bicycles usually do not have a pressure gauge, although the presence of one would be desirable both for inflating tires of racing bicycles and tires of crosscountry bicycles; in these fields it is in fact important for the user that the tires be inflated at the correct pressure in order to obtain maximum vehicle efficiency and minimum tire wear.

SUMMARY OF THE INVENTION

The technical aim of the present invention is indeed to provide a pressure gauge for pumps, particularly hand pumps for bicycles, motorcycles or the like, which allows to check inflation pressure values with the necessary accuracy.

Within the scope of this technical aim, an object of the present invention is to provide a pressure gauge for pumps which does not encumber the pump or make it awkward to operate.

Another object of the present invention is to achieve the above aim by means of a simple structure which is relatively easy to produce in practice, is safe in use and effective in operation as well as relatively modest in cost.

This aim and these objects are all achieved by the present pressure gauge for pumps, particularly hand pumps for bicycles, motorcycles or the like, characterized in that it comprises a cylinder sealingly connected between an outlet of the pump and a coupling for the valve of the tire, a piston being mounted inside said cylinder so that it can move in contrast with elastic means, said piston being connected to a rack which meshes with a rotatable sprocket with which a radial protrusion is rigidly associated, said radial protrusion having a pointer for indicating the pressure on a graduated scale.

BRIEF DESCRIPTION OF THE DRAWINGS

Further features will become apparent and evident from the detailed description of a preferred but not exclusive embodiment of a pressure gauge according to the invention, illustrated only by way of non-limitative example in the accompanying drawings, wherein.

DESCRIPTION OF THE PREFERRED EMBODIMENTS

Figure 1:
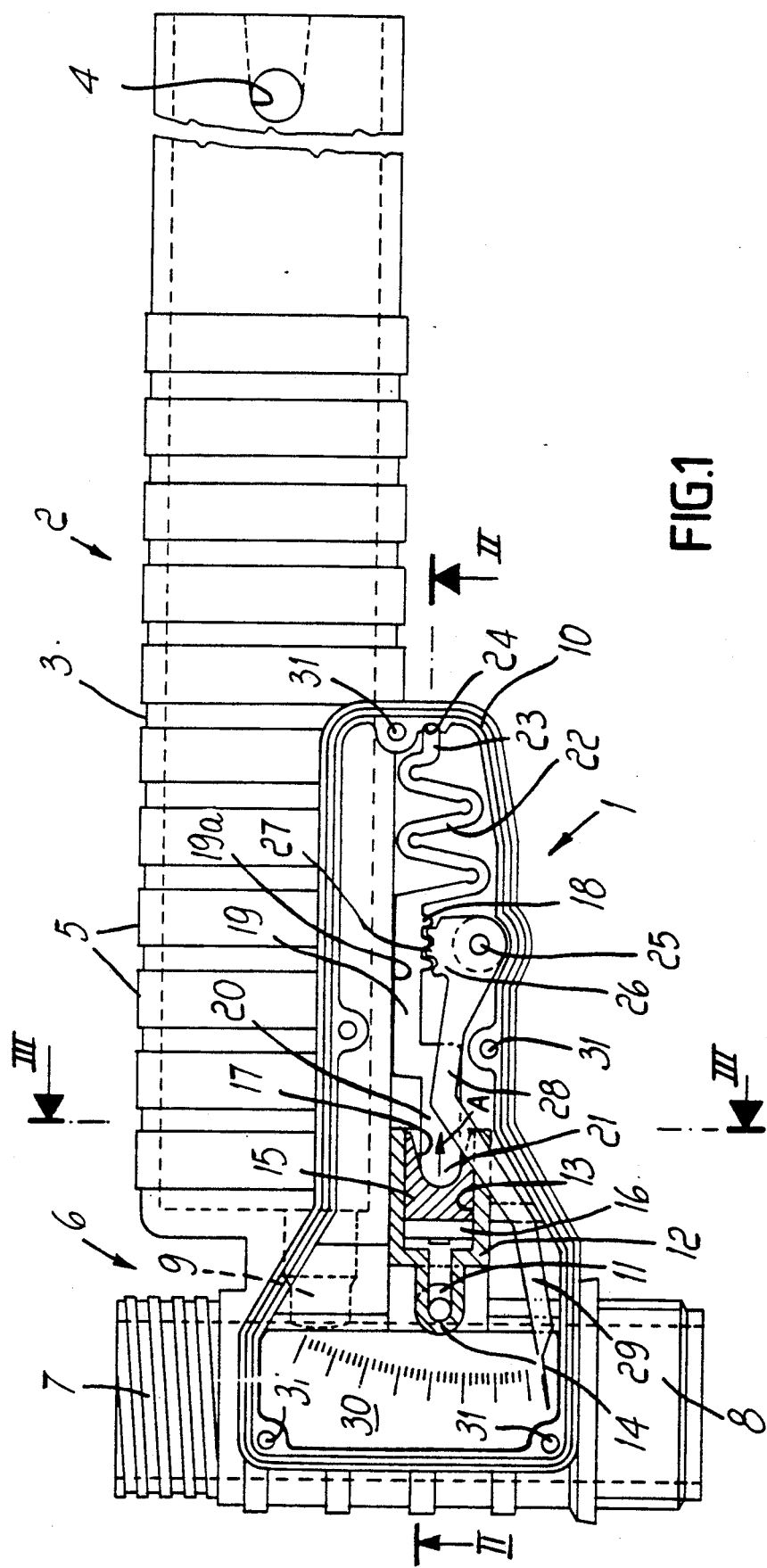
FIG. 1 is a front view of a pressure gauge for pumps, particularly hand pumps for bicycles, motorcycles or the like, according to the invention.
Figure 2:
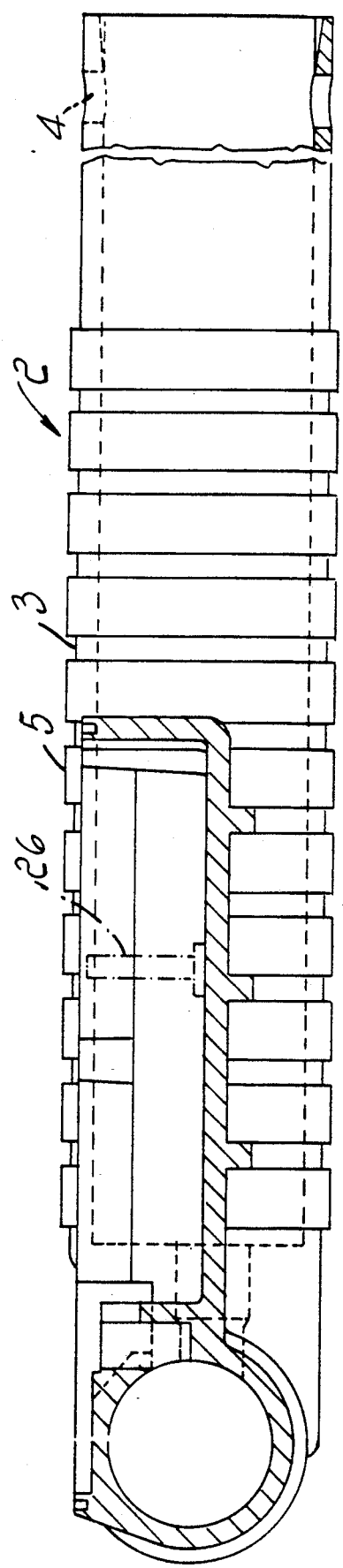
FIG. 2 is a partially sectional side view, taken along the plane II—II of FIG. 1.
Figure 3:
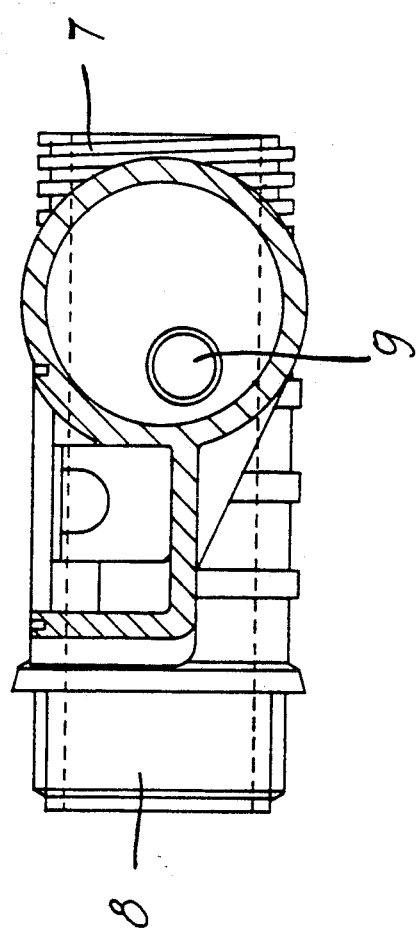
FIG. 3 is a partially sectional longitudinal view, taken along the plane III—III of FIG. 1.

With particular reference to the above figures, the reference numeral 1 generally designates the pressure gauge for a hand pump 2 for bicycles, motorcycles or the like.

Said pump 2 is constituted, in a known manner, by a cylinder 3 which is provided, at the piston insertion end, with a pair of opposite holes 4 for the snap-together coupling of the end face of the cylinder, which is usually fixed to the cylinder by screwing.

At its other end, said cylinder 3 is externally provided with transverse ridges 5 which improve its grip and is blended with a transverse tubular stub 6 which is externally provided, at its ends, with threads 7 and 8 for mating with a coupling for connection to the valve of the tire which is of the type which, when mated, keeps the check valve of the tire open: the stub 6 is connected to the cylinder through an opening 9 in which a check valve is mounted in a known manner.

The pressure gauge comprises a shaped box-like compartment 10 provided above the region which connects the cylinder 3 to the stub 6 and defines an elongated substantially parallelepipedal seat at said cylinder.

The stub 6 is connected to an oblique hole 11.

A body 12 is snugly fitted at the end of the seat of the compartment 10, and a cylinder 13 is defined therein; said cylinder is connected in an upward region to a bush 14 which is monolithic with the body 12 and is suitable for being sealingly inserted in the hole 11; the tubular stub 6 and the cylinder 13 are thus sealingly connected; this connection may be made permanent by glueing.

A piston 15 is slidingly mounted in the cylinder and is provided, at one end, with a disk 16 made of a material such as rubber which is rigidly associated therewith and may have a lip-shaped rim in order to increase tightness; at its other end, said piston is provided with a blind axial cavity 17.

A rack 18 is mounted in the compartment 10 and is defined in a slider 19 which has a straight side 19a for sliding along a straight side of the compartment and extends with a stem 20 whose rounded end 21 is suitable for coupling in the blind cavity 17.

At its other end, said slider 19 extends with a lamina 22 which has a zigzag shape and constitutes means for elastic contrast to the movement of the piston 15 in the direction of the arrow A; the end 23 of the lamina 22 bends at the axis of the stem 20 so as to enter a centering recess 24 of the compartment 10.

A vertical pivot 25 is arranged approximately halfway along the compartment 10, and a sprocket 26 is centered therein; said sprocket has a few teeth 27 which are suitable for meshing with the teeth of the rack 18.

A radial protrusion 28 is rigidly associated with the sprocket 26, is shaped so as to follow the profile of the box-like compartment 10 and ends with a pointer 29.

In the region spanned by the pointer 29 in the compartment 10 there is a graduated pressure scale 30; above the box-like compartment there is a transparent cover which is fixed to the pump by means of screws inserted in the corresponding holes 31.

The operation of the pressure gauge according to the invention is as follows: as the pressure in the stub 6 increases, the pressure in the cylinder 13 increases and the piston is pressed so as to move in the direction of the arrow A in contrast with elastic means constituted by the zigzag lamina: the rack moves in the direction of the arrow A by an amount which is proportional to the pressure which is present, and this movement of the rack turns the sprocket and thus moves the pointer 25 along the scale 30: when the pressure decreases, the lamina 22 returns to its initial configuration, returning the pointer to the zero position.

It is stressed that the pressure gauge and the pump according to the invention are constituted by a very small number of components and that said components can be rapidly and easily assembled: all the components are furthermore manufactured by molding material such as plastics and thus have a modest cost and are fully insensitive to the effects of humidity.

It has thus been observed that the invention achieves the intended aim and objects.

The invention thus conceived is susceptible to numerous modifications and variations, all of which are within the scope of the inventive concept. All the details may furthermore be replaced with other technically equivalent ones.

In practice, the materials employed, as well as the shapes and dimensions, may be any according to the requirements without thereby abandoning the protective scope of the following claims.

I claim:

1. Pressure gauge for pumps, particularly hand pumps for bicycles, motorcycles or the like, comprising; a coupling for connection to a valve of a tire; a cylinder sealingly connectable between an outlet of the pump and said coupling; a piston mounted inside said cylinder; a rack to which said piston is connected; elastic means associated with said rack; a rotatable sprocket with which said rack meshes; a radial protrusion rigidly associated with said rotatable sprocket, said radial protrusion ending with a pointer, said pointed indicating the pressure on a gradated scale, wherein said elastic means are constituted by a lamina having a zigzag shape, said lamina being rigidly associated with said rack, said pressure gauge being obtained by molding a plastic material.

* * * * *